(12) United States Patent
Heilersig et al.

(10) Patent No.: US 9,461,387 B2
(45) Date of Patent: Oct. 4, 2016

(54) CONNECTOR FOR ELECTRICALLY CONNECTING TWO PANELS HAVING SWITCHGEAR

(71) Applicant: EATON INDUSTRIES (NETHERLANDS) B.V., SC Hengelo (NL)

(72) Inventors: Dinant Heilersig, Markelo (NL); Marcel Van Dijk, CH Enschede (NL)

(73) Assignee: EATON INDUSTRIES (NETHERLANDS) B.V., SC Hengelo (NL)

( * ) Notice: Subject to any disclaimer, the term of this patent is extended or adjusted under 35 U.S.C. 154(b) by 0 days.

(21) Appl. No.: 14/395,526

(22) PCT Filed: Apr. 22, 2013

(86) PCT No.: PCT/EP2013/058252
§ 371 (c)(1),
(2) Date: Oct. 20, 2014

(87) PCT Pub. No.: WO2013/156629
PCT Pub. Date: Oct. 24, 2013

(65) Prior Publication Data
US 2015/0140871 A1    May 21, 2015

(30) Foreign Application Priority Data

Apr. 20, 2012 (EP) .................................... 12165023

(51) Int. Cl.
| H01R 13/00 | (2006.01) |
| H01R 13/40 | (2006.01) |
| H02B 1/16 | (2006.01) |
| H02B 13/00 | (2006.01) |

(52) U.S. Cl.
CPC ............ *H01R 13/40* (2013.01); *H02B 13/005* (2013.01); *H02B 1/16* (2013.01)

(58) Field of Classification Search
CPC .. H01R 13/40; H02B 13/005; H02B 13/035; H02B 1/16

USPC .......................... 361/605, 633; 439/559, 723
See application file for complete search history.

(56) References Cited

U.S. PATENT DOCUMENTS

| 5,257,161 A * | 10/1993 | Ocerin | ................. | H02B 13/005 |
| | | | | 361/605 |
| 6,419,512 B2 * | 7/2002 | Starck | ................. | H02B 13/005 |
| | | | | 439/278 |
| 6,976,862 B1 * | 12/2005 | Ormazabal Ocerin | | H01R 13/18 |
| | | | | 439/246 |

FOREIGN PATENT DOCUMENTS

| EP | 0520933 A1 | 12/1992 |
| EP | 1249911 A1 | 10/2002 |
| EP | 1577994 A1 | 9/2005 |
| EP | 1653582 A1 | 5/2006 |

* cited by examiner

*Primary Examiner* — James Harvey
*Assistant Examiner* — Oscar C Jimenez
(74) *Attorney, Agent, or Firm* — Leydig, Voit & Mayer, Ltd.

(57) ABSTRACT

A connector for electrically connecting two panels having switchgear has: two cups having a truncated cone shape for arrangement in a panel, the cups each having a conductor end extending through the tip of the cone and into the cup; an insulating body having two opposite truncated cone shaped outer surfaces each for reception in one of the cups and having a central passage; an electrically conducting element for connecting with the conductor ends extending in the central passage of the insulating body; wherein the insulating body is a molded body having an earth wire molded in; and wherein a coating of an electrical conducting layer is arranged on the earth wire and at least part of the insulating body.

10 Claims, 3 Drawing Sheets ived by the International Application was published in English on Oct. 24, 2013, as WO 2013/156629 A1 under PCT Article 21(2).

CONNECTOR FOR ELECTRICALLY CONNECTING TWO PANELS HAVING SWITCHGEAR

CROSS-REFERENCE TO RELATED APPLICATION

This application is a U.S. National Stage application under 35 U.S.C. §371 of International Application No. PCT/EP2013/058252, filed on Apr. 22, 2013, and claims benefit to European Patent Application No. 12165023.8, filed on Apr. 20, 2012. The International Application was published in English on Oct. 24, 2013, as WO 2013/156629 A1 under PCT Article 21(2).

FIELD

The invention relates to a connector for electrically connecting two panels having switchgear.

BACKGROUND

EP 0520933 discloses such a connector according to the preamble with which adjacent panels with switchgear are connected. The panels each have busbars running from one side of the panel to the other side. At the end of busbar a cup is arranged in the housing, which cup has a truncated cone shape. The busbar end extends through the tip of the truncated cone shape.

To connect two busbars of adjacent panels, an insulating body is put in between the panels, such that one end of the body is inserted into the cup of a first panel and the other end of the body is inserted into the cup of a second panel.

The insulating body has a central passage in which an electrically conducting element is arranged for creating an electrical connection between the two busbars of the adjacent panels.

As the application of this known connector is typically for medium and high voltage switchgear, an electric shield is also provided by a layer of electric conducting material being arranged on the outside of the insulating body. This electric shield needs to be earthed, which could be done by the contact in the cup of a housing wall.

EP 0520933 proposes to arrange on the insulating body a flange coated with an electrical conducting material. This flange needs to be clamped between two circumferential flanges of the cups of the connector. The flange is typically flexible and could be bent away when mounting two panels together. It is also possible that the insulating body is pushed further in one cup then in the other. As a result, the flange will not get clamped between the flanges, as it is seated in one of the cups.

If the flange is not clamped correctly between the cups, sharp edges could occur, which reduce the effect of the electric shield and cause spots of high field density.

SUMMARY

An aspect of the invention provides a connector configured to electrically connect two panels having switchgear, the connector comprising: two cups having a shape of a truncated cone for arrangement in a panel, each cup including a conductor end extending through a tip of the cone and into the cup; an insulating body including two opposite truncated cone shaped outer surfaces each configured to be received in one of the cups and having a central passage; an electrically conducting element configured to connect with the conductor ends extending in the central passage of the insulating body, wherein the insulating body is a molded body including an ground wire molded in, and wherein a coating an electrical conducting layer is arranged on the ground wire and at least part of the insulating body.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
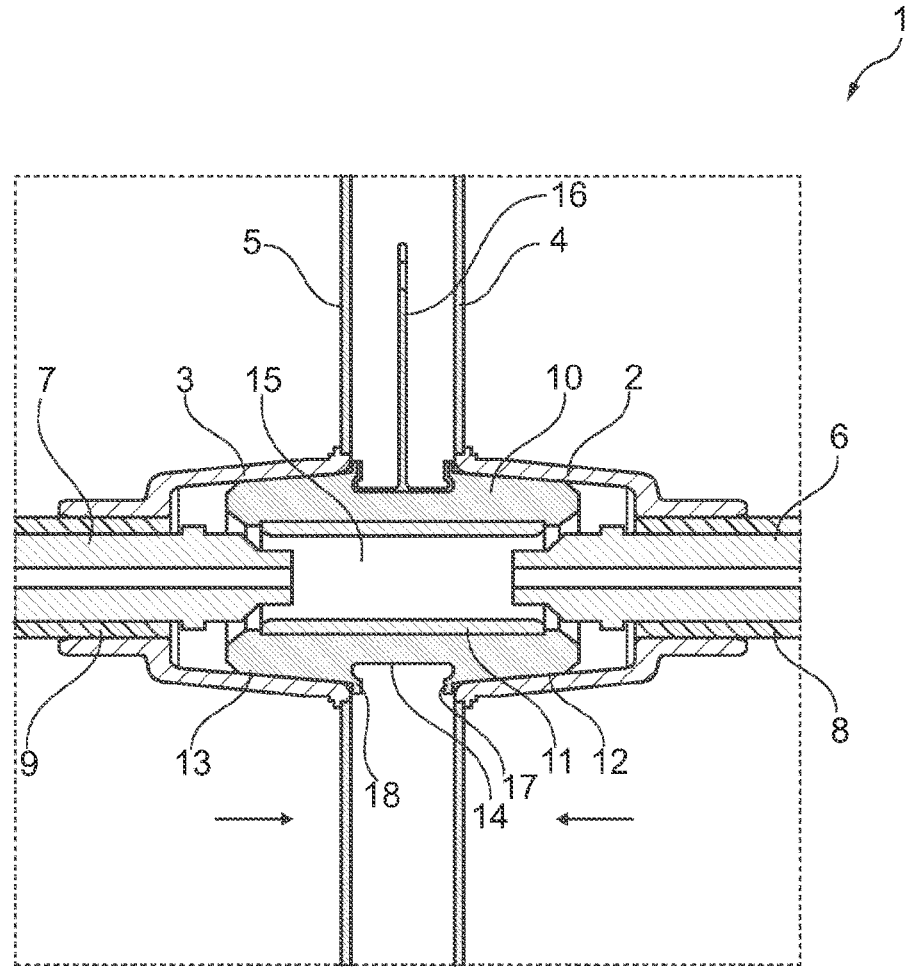
FIG. 1 shows a cross-sectional view of an embodiment of a connector according to the invention in a disconnected state.

An aspect of the invention provides a connector for electrically connecting two panels having switchgear, which connector comprises: two cups having a truncated cone shape for arrangement in a panel, the cups each having a conductor end extending through the tip of the cone and into the cup; an insulating body having two opposite truncated cone shaped outer surfaces each for reception in one of the cups and having a central passage; an electrically conducting element for connecting with the conductor ends extending in the central passage of the insulating body.

An aspect of the invention reduces the above mentioned disadvantages of the art.

An aspect of the invention provides a connector, which is characterized in that the insulating body is a molded body having an earth wire molded in; and in that a coating of an electrical conducting layer is arranged on the earth wire and at least part of the insulating body.

By molding an earth wire or lip in the insulating body, a good mechanical connection is achieved. Then by coating both part of the insulating body and the earth wire, it is ensured that the electrical shield on the insulating body has always a good electrical connection with the earth wire.

The earth wire itself can be attached to one of the panels to ensure also a good connection of the earth wire with the housing of a panel.

Furthermore, the earth wire ensures that the insulating body can shift between the cups, while maintaining a good electrical connection and keeping the electrical shield. So, if the insulating body moves between the cups or is not centered in the cups, the shielding action is still available.

In a preferred embodiment of the connector according to the invention the insulating body comprises a cylindrical surface connecting the two opposite truncated cone shaped outer surfaces.

This cylindrical surface provides a spacer between the two truncated cone shaped surfaces. The spacer ensures that some space is available between the two cups of the adjacent panels, such that sufficient space is available for the earth wire and for enabling some longitudinal movement of the insulating body between the two cups.

Preferably, the earth wire extends from the cylindrical surface.

In another preferred embodiment of a connector according to the invention the cylindrical surface is recessed. The recess ensures that the electrical shield, which is arranged on the cylindrical surface, will not be deformed, when the truncated cone shaped surfaces are pressed in the cups.

Yet another preferred embodiment of the connector according to the invention comprises a lip arranged at the base of each truncated cone shape.

This lip is pushed inside when the truncated cone shape is pressed in the cup. The lip provides a preset shape such that the shape is always predictable. As a result, the shield will also have a predictable shape due to the lips and a controlled electrical field is obtained without any undesired field densities.

This arrangement of lips and recessed cylindrical surface can also be used with other embodiments not according to the invention to achieve the defined surface in order to get a predictable electrical field.

Preferably, the connector according to the invention the lip has a rounded cross-section. A rounded cross-section provides for a even distribution of the electrical field and prevents high concentrations, which could result in for example flash over.

In still another embodiment of the connector according to the invention, the lip is hingedly arranged. The lip will hinge towards a position in which the lips provide the borders of the recessed cylindrical surface.

In a further embodiment of the connector according to the invention the electrically conducting element is cylindrical. Preferably, the electrically conducting element has a plurality of longitudinal slits to provide fingers.

When the insulating body is pressed in the truncated cone shaped cups, the insulating body will be compressed. As a result the electrically conducting element is compressed also due to the slits and can clamp onto the ends of the busbars extending into the cups.

The fingers have preferably elastic properties to provide a contact pressure.

Preferably, the coating of an electrical conducting layer extends over both truncated cone shaped outer surfaces. As a result a shield is created, which shields of the electrical current running through the busbars and the electrically conducting element.

FIG. 1 shows a connector 1 according to the invention in a cross-sectional view and in disconnected state. The connector 1 has two cups 2, 3 which are arranged in the wall 4, 5 of a panel with switchgear. The cups 2, 3 have a truncated cone shape.

A busbar 6, 7 extends through the tip of the cone shape 2, 3. An isolation layer 8, 9 is arranged between the busbar 6, 7 and the cup 2, 3.

To connect the busbars 6, 7 an isolating body 10 with an electrically conducting element 11 is provided. The isolating body 10 has on both ends 12, 13 a truncated cone shaped outer surface and in between a recessed cylindrical outer surface 14.

A central passage 15 is provided in the isolating body 10. The electrically conducting element 11 is provided in this central passage 15.

From the cylindrical outer surface 14, an earth wire 16 extends, which is molded in the isolating body 10. The earth wire 16 and the surrounding cylindrical outer surface 14 is coated with an electrically conducting layer, such that an electric shield is provided.

Figure 2:
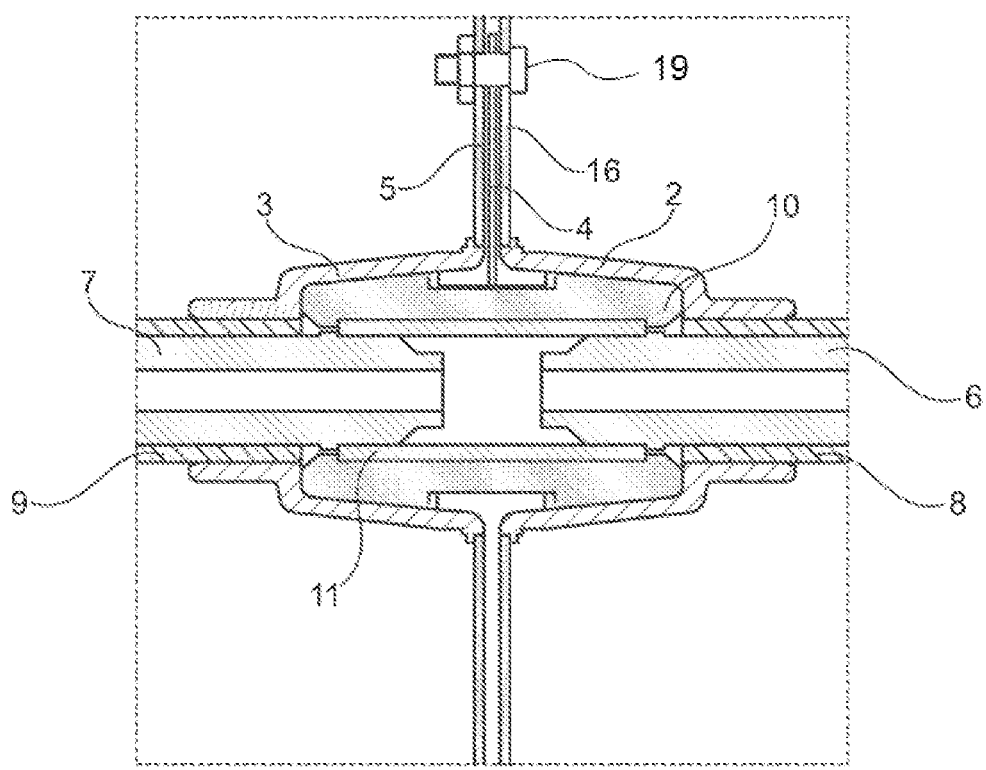
FIG. 2 shows the embodiment of FIG. 1 in connected state.

On each end of the cylindrical surface 14 hinged lips 17, 18 are provided. These lips will flex inwardly when the connector is pressed in the connected state as shown in FIG. 2. This ensures that the lips 17, 18 provide a defined shape for the cylindrical surface ensuring an even electrical field.

When the panels 4, 5 are moved together in order to bring the connector 1 in a connected state (see FIG. 2), the insulating body 10 is pressed in the cups 2, 3. Due to the conical shape a firm connection is obtained without inclusion of any air pockets, which would influence the electric field.

By moving the panels 4, 5 together, the ends of the busbars 6, 7 are pressed in the electrically conducting element 11 such that an electric connection between the busbars 6, 7 is obtained. Electrically conducting element 11 provides and keeps pressure on the isolating body 10, so that the electrical insulation between cups 2, 3 and isolating body 10 is ensured.

Figure 3:
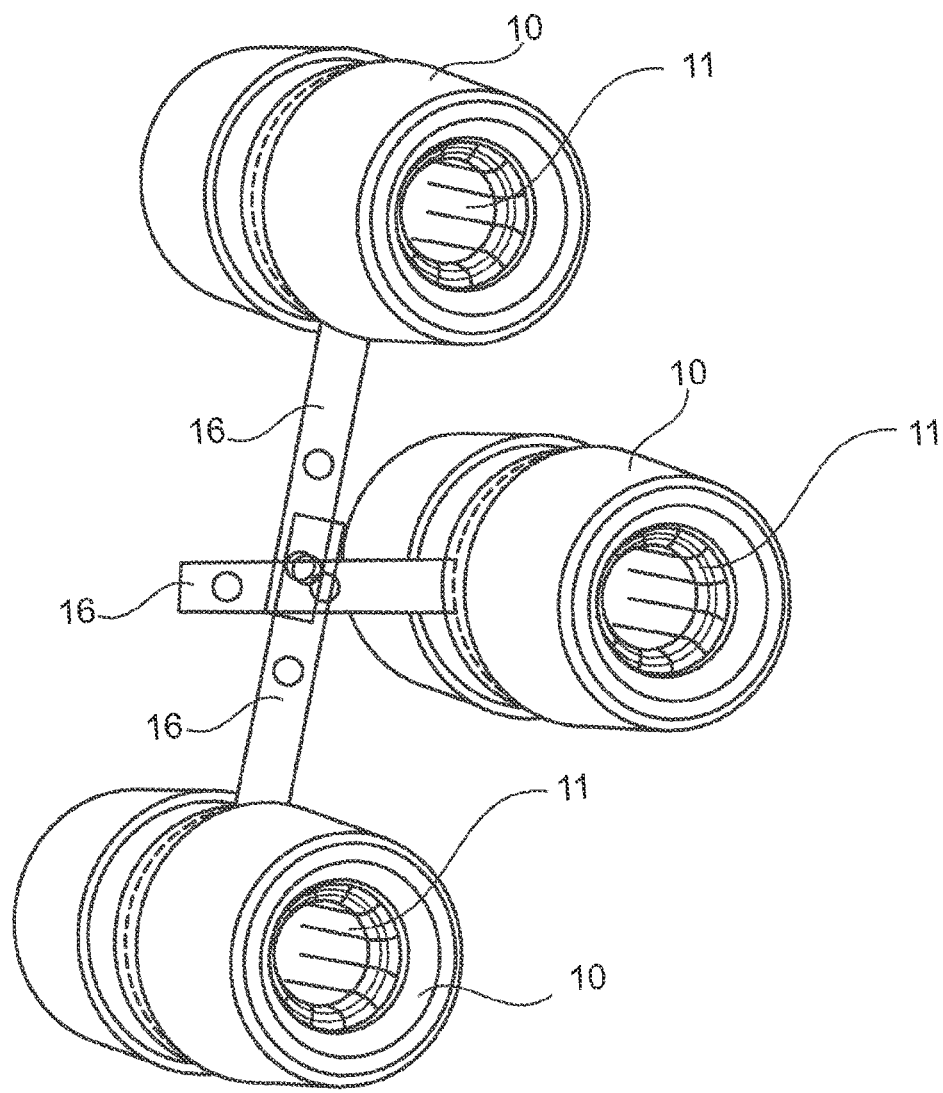
FIG. 3 shows part of three connectors according to the invention in a typical three phase setup.

The earth wire 16 is mounted by a bolt 19 to one of the housings of the panels 4, 5. FIG. 3 shows three insulating bodies 10 with electrically conducting elements 11 in a typical arrangement for a three phase setup. The earth wires 16 are directed towards each other such that they can be mounted together to a housing of a panel or the like.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A connector configured to electrically connect two panels having switchgear, the connector comprising:
    two cups having a shape of a truncated cone for arrangement in a panel, each cup including a conductor end extending through a tip of the cone and into the cup;
    an insulating body including two opposite truncated cone shaped outer surfaces each configured to be received in one of the cups and having a central passage;
    an electrically conducting element configured to connect with the conductor ends extending in the central passage of the insulating body; and
    a lip arranged on the insulating body at a base of each cup, wherein the lip is configured to flex inwardly when the connector is pressed into a connected state thereof,
    wherein the insulating body is a molded body including a ground wire molded in, and wherein a coating of an electrical conducting layer is arranged on the ground wire and at least part of the insulating body.

2. The connector of claim 1, wherein the insulating body includes a cylindrical surface connecting the two opposite truncated cone shaped outer surfaces.

3. The connector of claim 2, wherein the ground wire extends from the cylindrical surface.

4. The connector of claim 3, wherein the cylindrical surface is recessed.

5. The connector of claim 1, wherein the lip has a rounded cross-section.

6. The connector of claim 1, wherein the lip is hingedly arranged.

7. The connector of claim 1, wherein the electrically conducting element is cylindrical.

8. The connector of claim 7, wherein the electrically conducting element includes a plurality of longitudinal slits to provide fingers.

9. The connector of claim 8, wherein the fingers have elastic properties to provide a contact pressure.

10. The connector of claim 1, wherein the coating of the electrical conducting layer extends over both truncated cone shaped outer surfaces.

* * * * *